Feb. 23, 1926.

F. E. REED 1,573,997

INSECT DESTROYING MACHINE

Filed May 5, 1925    2 Sheets-Sheet 1

Inventor
F. E. Reed

By  Clarence A. O'Brien
Attorney

Feb. 23, 1926.

F. E. REED

INSECT DESTROYING MACHINE

Filed May 5, 1925     2 Sheets-Sheet 2

1,573,997

Inventor
F. E. Reed
By Clarence O'Brien
Attorney

Patented Feb. 23, 1926.

1,573,997

UNITED STATES PATENT OFFICE.

FRANK E. REED, OF GLENWOOD, MINNESOTA.

INSECT-DESTROYING MACHINE.

Application filed May 5, 1925. Serial No. 28,131.

*To all whom it may concern:*

Be it known that I, FRANK E. REED, a citizen of the United States, residing at Glenwood, in the county of Pope and State of Minnesota, have invented certain new and useful Improvements in Insect-Destroying Machines, of which the following is a specification.

The present invention relates to an insect destroying machine, and is particularly designed for killing grasshoppers. The principal object of the invention is to provide a machine of this nature having means for sucking the grasshoppers into the machine and crushing them by means of a pair of rollers, the suction means and rollers being operable by the wheeled structure of the machine.

Another important object of the invention is to provide a machine of this nature, which is exceedingly simple in construction, efficient and reliable in operation, not likely to easily become out of order, convenient, and otherwise well adapted for the purpose for which it is designed.

With the above and numerous other objects in view, as will appear as the description proceeds, the invention resides in certain novel features of construction, and in the combination and arrangement of parts as will be hereinafter more fully described and claimed.

Figure 1:
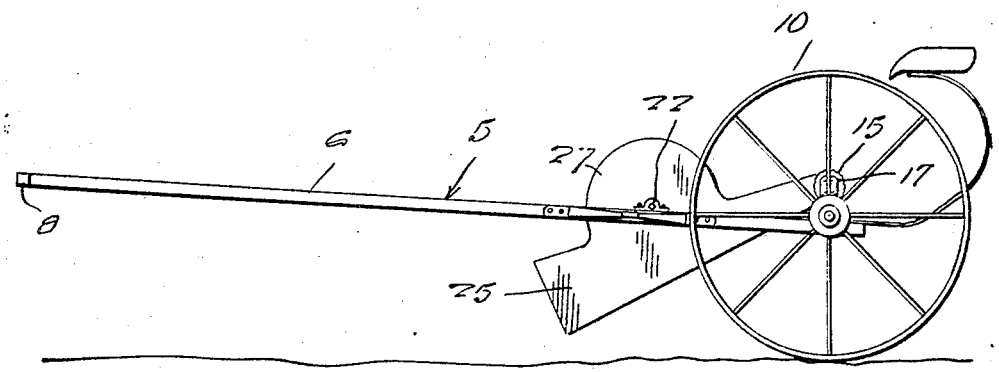
Figure 1 is a side elevation of the machine embodying the features of my invention.
Figure 4:
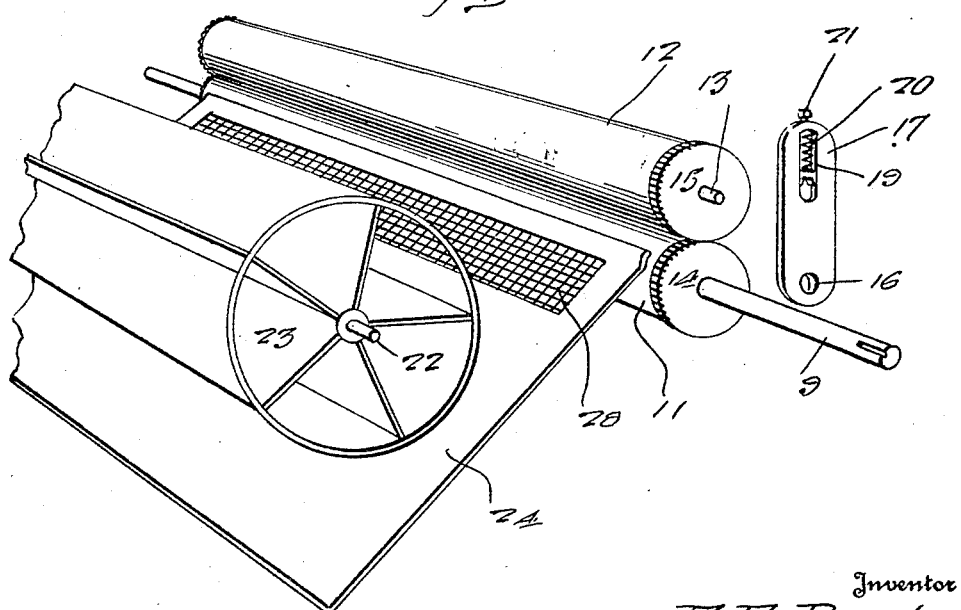
Figure 4 is another fragmentary perspective view of the machine, showing the parts disassembled.
Figure 2:
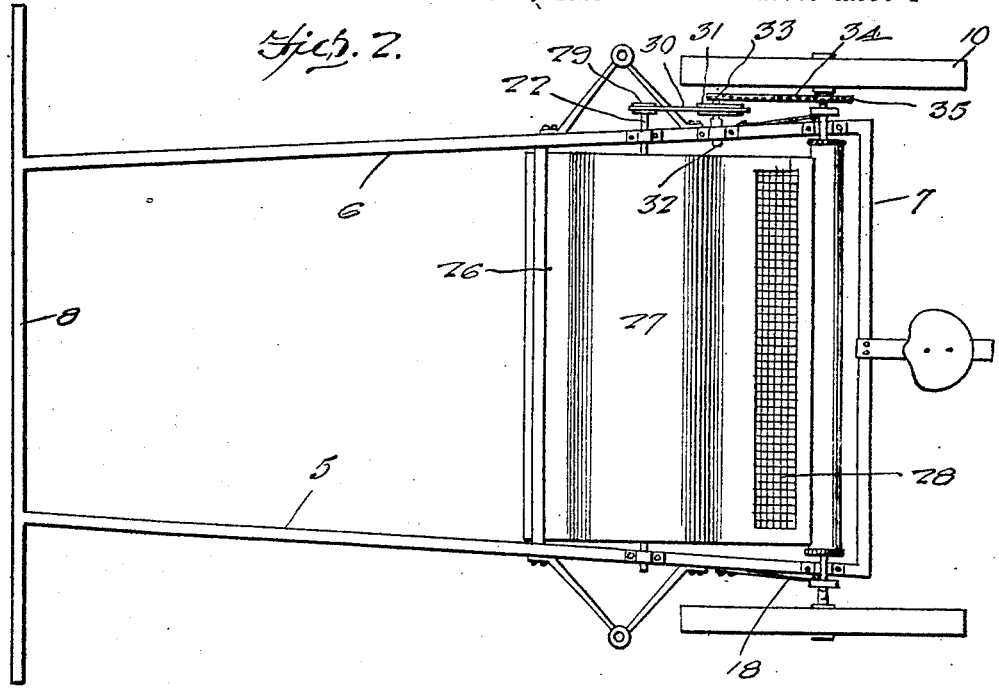
Figure 2 is a top plan view thereof.
Figure 3:
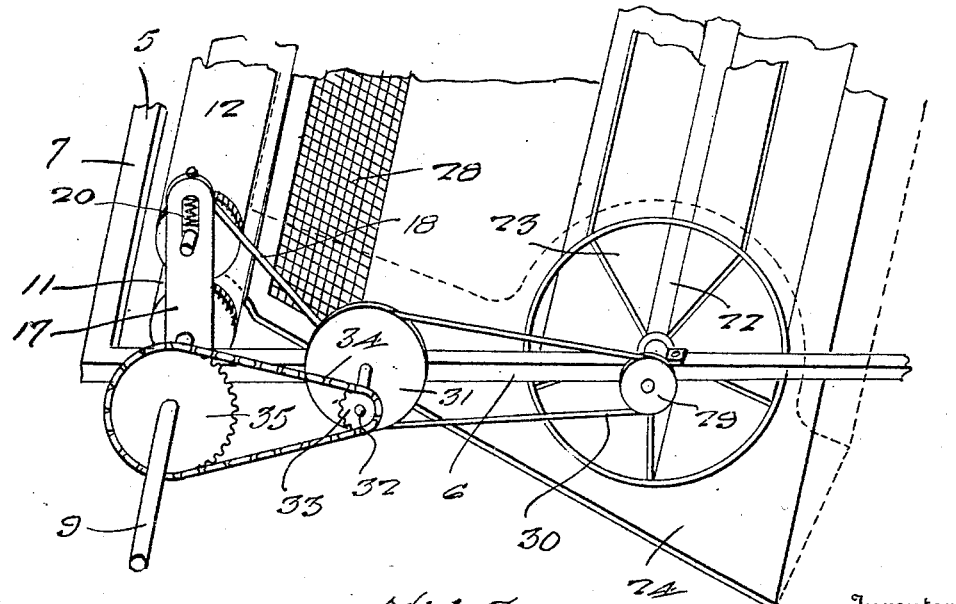
Figure 3 is a fragmentary perspective view, showing portions of the machine.

Referring to the drawings in detail, it will be seen that 5 designates the frame, which includes the two longitudinally extending members connected by a cross member 7 at their rear end and a cross member 8 at their forward ends which extend beyond the members 6, so that draft animals or the like may be attached thereto. A shaft 9 is journaled transversely of the longitudinally extending side members 6 and has wheels 10 mounted thereon, one wheel being keyed to the shaft 9 for causing rotation thereof, as the machine progresses forwardly. A roller 11 is mounted on the shaft 9 and engages with a roller 12 mounted on a shaft 13. Gears 14 and 15 are mounted on the shafts 9 and 13 respectively, and are normally in mesh with each other. The shaft 9 extends through the bottom openings 16 of standards 17, and these standards are maintained in an upright position by brace rods 18. Longitudinally extending slots 19 are provided in the upper portions of the standards 17 for receiving the shaft 13 of the roller 12, and this shaft is held downwardly, by means of springs 20, which may be tensioned through screws 21 or in any other suitable manner.

A shaft 22 is journaled across the longitudinally extending frame member 6, forwardly of the shaft 9, and has mounted thereon, to rotate therewith, a fan 23. A fan casing is disposed about the fan, including the bottom flat clamping plate 24, the side plates 25, and the upper plate 26, which is provided with a semi-cylindrical upwardly extending portion 27. The upper and lower plates are provided at their rear ends with screened openings 28. These upper and lower plates converge toward each other rearwardly, so as to terminate in close proximity to the adjacent portions of the rollers 11 and 12. The shaft 22 is operated, by a sprocket 29, over which is trained a chain 30. This chain is also trained over a sprocket 31 on a shaft 32, journaled in one side member 6 and having thereon a sprocket 33, over which a chain 34 is trained. This chain 34 is also trained over a sprocket 35 on the shaft 9. It will thus be seen that the fan revolves in the same direction with the upper rollers 12 and in an opposite direction from the roller 11. The fan, therefore, will cause a suction in the fan casing, so that the grasshoppers will be fed between the crushing rollers 11 and 19, thus being killed.

It is thought that the construction, operation, and advantages of the invention, will be clearly understood, without a more detailed description thereof. It is desired, however, to point out that numerous changes in the details of construction, in the combination and arrangement of parts may be resorted to, without departing from the spirit or scope of the invention as hereinafter claimed, or sacrificing any of its advantages.

Having thus described my invention, what I claim as new is:

In a machine of the class described, a wheeled frame, a shaft for the wheels of the frame extending transversely from the frame, a roller on said shaft to be rotated therewith, a pair of standards having openings at their lower ends for receiving the shaft, brace rods connected to the upper ends of the standards and to the frame, a second shaft journaled in the standards, means urging the second shaft toward the first shaft, a roller on the second shaft normally engaged with the first roller, gearing between the two shafts, and suction means associated with the rollers for leading insects thereto, so that they may be crushed therebetween.

In testimony whereof I affix my signature.

FRANK E. REED.